Aug. 8, 1967   N. O. ROSAEN   3,334,746
CONTINUOUS BAYONET FILTER DEVICE
Filed Jan. 11, 1965   3 Sheets-Sheet 1

INVENTOR
NILS O. ROSAEN
BY
*Hauke & Hauke*
ATTORNEYS

INVENTOR
NILS O. ROSAEN
BY
Hauke & Hauke
ATTORNEYS

United States Patent Office 3,334,746
Patented Aug. 8, 1967

3,334,746
CONTINUOUS BAYONET FILTER DEVICE
Nils Olav Rosaen, Bloomfield Hills, Mich., assignor of one-half to Borje O. Rosaen, Ann Arbor, Mich.
Filed Jan. 11, 1965, Ser. No. 424,703
16 Claims. (Cl. 210—108)

The present invention relates to mobile or bayonet type filter devices and more particularly to such a device having means automatically operable to clean the filter element in place when it becomes clogged.

Certain of my copending applications Ser. Nos. 340,365 and 341,488, each filed on Jan. 27, 1964, and now abandoned in favor of continuation-in-part application Ser. No. 562,417, filed June 8, 1966, disclose certain new mobile or bayonet filter devices which are adapted to be inserted into the reservoir of a fluid system. These new filter devices have the particular advantage that much of the housing structure heretofore necessary for such filter devices is eliminated. This produces a substantial reduction in manufacturing costs for such devices. Further, the filter devices are readily accessible for removal of the filter element for replacement and means are provided for bypassing the filter element when it reaches a predetermined clogged condition. Indicating means are provided exteriorly of the devices for indicating the condition of the filter element.

While these filter devices have proven to be quite satisfactory, the filter elements for such devices like all filter elements of fluid filtering systems, require periodic cleaning and/or replacement. The aforementioned copending applications did not disclose means for cleaning the filter element of such devices in place.

Another copending application Ser. No. 429,552, filed Feb. 1, 1965, discloses a mobile or bayonet filter provided with means for cleaning the element in place. This device however, is not automatically operable and the system must be completely shut down during the cleaning cycle.

While a number of other types of filter devices have been heretofore proposed which include means for cleaning the element in place, these usually include means either automatically or selectively operable to eject a flow of the system fluid through the element in a direction reversed to normal flow therethrough. In many of these devices the particles dislodged from the element are thrown back into the system on the inlet side of the element where upon resumption of the operation of the system they soon again clog the element. In other systems the fluid being used to clean the element carries the particles out of the device. While this produces a more effective cleaning of the element, it results in a substantial loss of system fluid and system pressure.

The present invention provides a mobile or bayonet type filter device having all of the advantages of the devices of my aforementioned copending applications and including means automatically operable to clean the filter element without requiring the element to be removed from the tubular filter housing. The filter device is provided with a filter chamber and a collection chamber is formed in a point remote from the filter chamber. Means are provided to seal off the filter element from the fluid reservoir upon the filter element being clogged a predetermined degree and to open a fluid path from the filter chamber to the collection chamber. A separate fluid, preferably in the form of pressurized air, is then directed through the filter element in a direction reverse to the normal fluid flow through the element to dislodge the particles accumulating on the filter element and to deposit these particles in the collection chamber where they can be collected and removed from the system. Bypass valve means are provided to permit the continued operation of the fluid system as the element is being cleaned. Air is preferred as the cleaning fluid since a source of pressurized air is readily available in areas such as factories or the like where such fluid systems are generally used.

It is an object then of the present invention to improve mobile or bayonet filter devices by providing means automatically operable to clean the filter element of such devices in place.

It is still another object of the present invention to more effectively clean the filter element of a fluid system in place by providing means automatically operable to eject a flow of fluid through the filter element in a direction opposite the normal fluid flow therethrough upon the filter element becoming clogged a predetermined degree and to carry the foreign particles dislodged thereby to a collection chamber remotely disposed from the filter chamber.

It is yet another object of the present invention to improve bayonet or mobile type filter devices by providing such a device with a filter chamber, a filter element normally disposed within the filter chamber, means defining a collection chamber disposed remotely from the filter chamber, means operable to move the filter element in the filter chamber in response to increases in the pressure differential across the filter element, means actuated by the pressure responsive means to close communication between the filter chamber and the fluid reservoir, and means direction a cleaning fluid through the filter element in a direction opposite to the flow of the working fluid therethrough and into the collection chamber.

Still further objects and advantages of the present invention will readily occur to one skilled in the art to which the invention pertains upon reference to the following drawings in which like reference characters refer to like parts throughout the several views and in which FIG. 1 is a cross-sectional view of one preferred filter assembly.

Description

Figure 1:
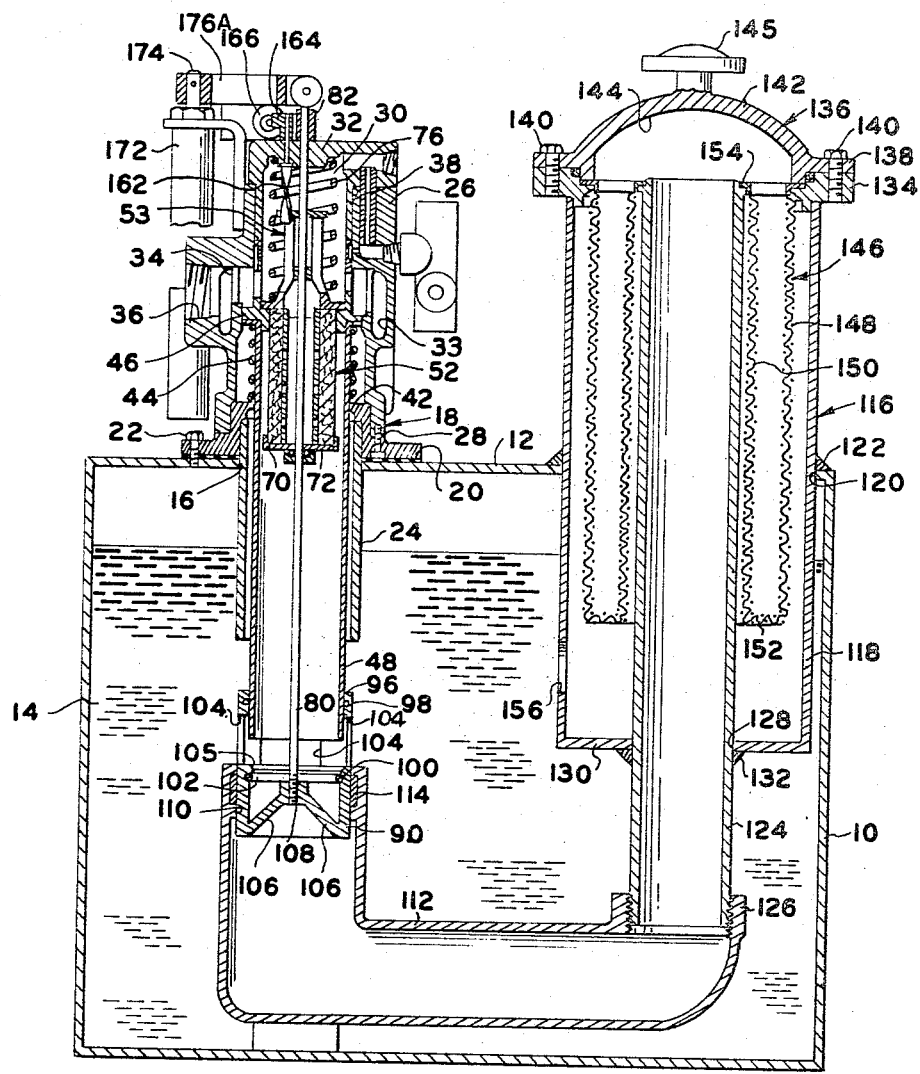

Referring now to the drawings for a more detailed description of the present invention, a preferred embodiment thereof is illustrated in FIG. 1 as comprising a fluid reservoir generally indicated at 10. The fluid reservoir 10 comprises a top plate 12 and is at least partially filled with a suitable fluid 14. An opening 16 is provided in the top plate 12. A preferred filter device is generally indicated at 18 and as can best be seen in FIG. 2 includes a mounting member 20 secured to the top plate 12 by any convenient means such as bolts 22. A tubular housing member 24 extends vertically through the opening 16 provided in the top plate 12 and into the interior of the fluid reservoir 10. The inlet or interior end of the tubular member 24 is preferably positioned below the minimum level of the fluid 14 in the reservoir 10. The tubular housing member 24 is preferably secured to the mounting member 20 by any convenient means such as bolts or screws (not shown) with its upper end positioned exteriorly of the reservoir 10. A housing member 26 is secured to the mounting member 20 by a plurality of annularly spaced screws 28 closes the upper end of the tubular member 24. The housing member 26 is hollow to form a chamber 30 and a cap member 32 closes the upper end of the chamber 33 registering with the chamber 30 through a plurality of annularly spaced ports 34 and with an outlet 36 provided in the housing 30.

Figure 2:
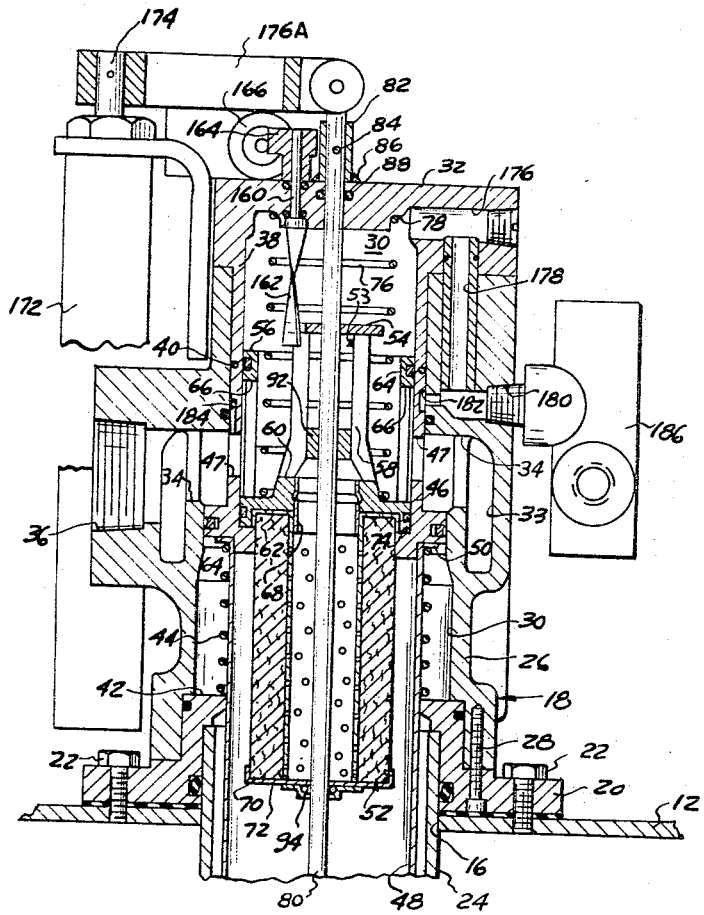
FIG. 2 is an enlarged fragmentary view of portions of the assembly illustrated in FIG. 1.

As can best be seen in FIG. 2, the cap member 32 is provided with an axially extending hollow boss portion 38 which extends into the chamber 30 in close engagement with the inner wall of the housing member 26. An O-ring seal 40 prevents fluid leakage between the housing member 26 and the cap member 32. The mounting member 20 is provided at its upper edge with a radially inwardly extending scalloped flange portion 42 which forms the seat for one end of a spring 44. The opposite end of the spring 44 urges an annular valve member 46 to a position in which its upper edge engages the lower edge of the hollow boss portion 38 of the cap member 32 so that the valve member 46 is normally in the position indicated in FIGS. 1 and 2. An interior tubular member 48 is provided with an outwardly extending upper flange portion 50 urged against the lower edge of the valve member 46 by the spring member 44 and maintained in a central position by the flange portion 42 of the mounting member 20. The interior tubular member 48 extends axially downwardly through the tubular housing member 24 and terminates within the fluid reservoir 10 in a position below the inlet end of the tubular member 24 as illustrated.

A filter assembly generally indicated at 52 comprises a porting member 53 having an inner annular member 54 and an outer annular member 56 as shown in FIG. 2. The inner annular member 54 is provided with an axially extending portion 58 forming a plurality of annularly spaced axially extending through slots 60. The lower edge of the portion 58 is connected to the outer annular member 56 by a radially extending medial portion 62. The outer annular member 56 is substantially cylindrical and is mounted to axially slidably engage the inner surface of the hollow boss portion 38 of cap member 32 and the inner surface of the annular valve member 46. A pair of axially spaced piston rings 64 are carried by the outer annular member 56. The outer annular member 56 is provided with a plurality of annularly spaced ports 66 and the medial portion 62 is provided with a central opening 68.

The filter assembly 52 further preferably comprises a substantially cylindrical filter element 70 having its upper edge seated in a suitable recess provided in the medial portion 62. The lower edge of the filter element 70 is closed by a flanged closure plate 72 and the filter element 70 and the closure plate 72 are secured to the medial portion 62 by a plurality of annularly spaced screws (not shown).

As can best be seen in FIG. 2, the valve member 46 is formed with an internal shoulder 74 normally in engagement with the outer annular portion 56 to limit downward axial movement of the filter assembly 52. A spring member 76 seated in a suitable annular recess 78 is provided in the cap member 32 engages the upper surface of medial portion 62 to urge the outer annular portion 56 against the shoulder 74 so that the filter assembly 52 is normally in position as indicated in FIGS. 1 and 2. Slots 47 provided in the valve member 46 provide communication between the outlet chamber 30 and the outlet 36 when the valve member 46 is in the position illustrated in FIGS. 1–2.

An elongated rod member 80 extends axially through the cap member 32 and is staked to a bushing 82 by a pin member 84 as shown in FIG. 2. The bushing 82 is in turn secured to the external surface of the cap member 32 as by welding as indicated at 86 so that upward axial movement from the position illustrated in FIGS. 1 and 2 of the rod member 80 produces a corresponding upward axial movement of the cap member 32. An O-ring seal 88 carried by the cap member 32 prevents fluid leakage along the rod member 80. The rod member 80 extends axially downwardly through the housing 26 and the tubular members 48 and 24 and into the fluid reservoir 10. As shown in FIG. 1, the free end of the rod member 80 extends axially past the end of the inner tubular member 48 and carries a valve member 90. Medial support for the rod member 80 is provided by an internal boss portion 92 as shown in FIG. 2 extending radially inwardly from the legs 58 and by the closure plate 72. An O-ring seal 94 is carried by the closure plate 72 to prevent fluid leakage into the filter element 70 along the rod member 80.

The valve member 90 is substantially cylindrical and as shown in FIG. 1 is provided at its upper edge with a radially inwardly extending flange portion 96 adapted to axially slidably engage the outer surface of the inner tubular member 48. An O-ring seal 98 is carried by the flange portion 96. The valve member 90 is provided at its lower portion with a radially inwardly extending enlarged portion 100 which carries on its inner surface an O-ring seal 102. An internal bevel 105 is formed in the valve member 90 at the inner edge of the enlarged portion 100. A plurality of annularly spaced ports 104 are provided intermediate the flanged portion 96 and the enlarged portion 100. The valve member 90 is carried by the rod member 80 by means of a plurality of annularly spaced radially inwardly extending arm supports 106 which carry a centrally disposed internally threaded boss portion 108. The free end of the rod member 80 is threaded as illustrated and is received by the internally threaded portion of the boss 108.

As can best be seen in FIG. 1, the valve member 90 is adapted to axially slidably engage an internal wall portion 110 formed in a substantially U-shaped tubular conduit 112. A piston seal 114 is carried by the wall portion 110 to engage the exterior surface of the valve member 90. The tubular conduit 112 is carried in the fluid reservoir 10 and is connected to a collector assembly generally indicated at 116.

As can best be seen in FIG. 1, the collector assembly 116 preferably comprises a tubular member 118 extending vertically through an opening 120 provided in the top plate 12 of the reservoir 10. The tubular member 118 is positioned with a lower portion disposed within the reservoir 10 and an upper portion disposed above the top plate 12 by means of welding as indicated at 122 securing the tubular member 118 to the top plate 12.

The collector assembly 116 further comprises a stand pipe 124 having its lower end connected in fluid tight fashion to an upstanding portion 126 of the tubular conduit 112. The stand pipe 124 extends axially upwardly into the tubular member 118 through an opening 128 provided in a bottom wall 130, closing the lower end of the tubular member 118. The stand pipe 124 is preferably secured to the bottom wall 130 in a fluid-tight manner as by welding as indicated at 132. An annular flanged member 134 is secured to the upper edge of the tubular member 118 and provides the means for carrying a cap member 136.

The cap member 136 is provided with a peripheral flange portion 138 adapted to seat against the flanged member 134 and to be secured thereto by a plurality of screws or bolts 140. The cap member 136 is also provided with a hollow, spherical medial portion 142 which defines a chamber 144 disposed above and in communication with the upper ends of the tubular member 118 and the stand pipe 124. A handle portion 145 is formed on the upper exterior surface of the medial portion 142.

An annular wire basket 146 is formed with radially spaced annular and axially elongated side walls 148 and 150 and a bottom portion 152. The basket 146 is retained in a position extending intermediate the tubular member 118 and the stand pipe 124 by the cap member 136 and the flanged member 134 and by a support member 154 carried by the upper edge of the standpipe 124. An opening 156 is provided in the lower portion of the tubular member 118 preferably below the bottom portion 152 of the basket 146 to provide communication between the interior of the reservoir 10 and the space between the tubular member 118 and the stand pipe 124.

As can best be seen in FIG. 2, the cap member 32 of the filter device 18 rotatably carries a shaft 160. The shaft 160 is connected at its interior end to an actuator member 162. The actuator member 162 is formed of an elongated rectangular piece of material twisted uniformly about its longitudinal axis. The actuator member 162 is received axially by a rectangular slot formed in the portion 54 of porting member 53 so that upon axial movement of the porting member 53 a corresponding rotation of the actuator member 162 and shaft 160 is produced. The exterior end of the shaft 160 is connected to a pointer element 164 to rotate therewith so that the pointer element 164 visibly indicates the axial position of the porting member 53 exteriorly of the filter device 18.

Figure 3:
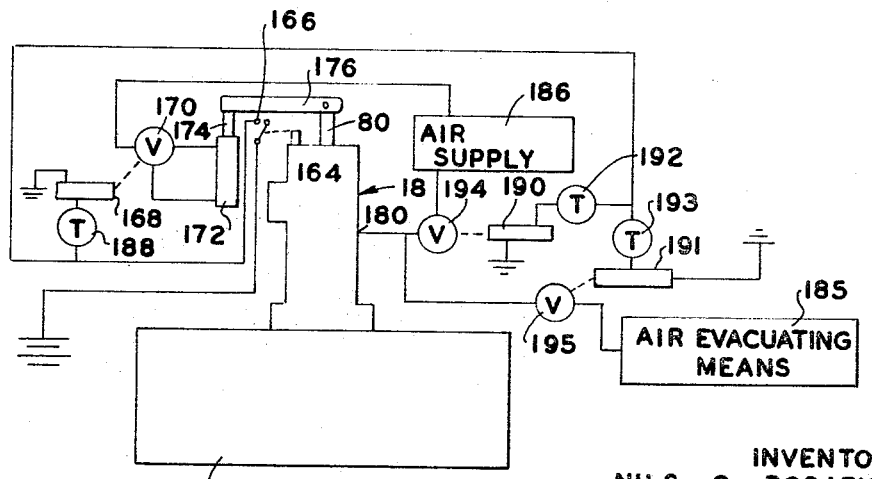
FIG. 3 is a diagrammatic view of the preferred system of the present invention and illustrated fragmentarily and diagrammatically.

The pointer element 164 is also operable to actuate a normally open switch 166 as illustrated diagrammatically in FIG. 3. The switch 166 is electrically connected in series with a solenoid 168 which is operable to actuate a conventional four-way valve 170. The valve 170 is operable to control a fluid cylinder 172 in a conventional manner.

The fluid cylinder 172 is mounted on the housing member 26 and is provided with an actuating rod 174 disposed to move axially substantially parallel to the axis of the rod member 80. The actuating rod 174 is connected to the rod member 80 by a transversely disposed connecting member 176A so that axial movement of the actuating rod 174 produces a corresponding axial movement of the rod member 80.

Referring again to FIG. 2, the cap member 32 is provided with a radially inwardly extending passage 176 which communicates with the recess 78. An axially extending passage 178 provided in the housing member 30 intersects the passage 176. A port 180 intersects the passage 178 and normally registers with an annular recess 182 provided in the valve member 46. An axial passage 184 formed in the valve member 46 provides communication between the recess 182 and the outlet 36. A conventional air evacuating means 185 (as shown in FIG. 3) and an air supply 186 is connected to the port 180.

In operation with the outlet 36 connected to a pumping means (not shown) and the device in the position illustrated in FIGS. 1–2, fluid is normally drawn from the reservoir 10 through the slots 104 of the valve member 90, axially upwardly through the interior of the inner tubular member 48, radially inwardly through the filter element 70, through the porting member 53, and out the outlet 36.

As the filter element 70 begins to become clogged an increase in the pressure differential will be produced across the element 70 and will act through the medial portion 62 of porting member 53 to produce an upward axial movement of the filter assembly 52 against the force of the spring 76. This axial movement of the filter assembly 52 is essentially a linear function of the degree of clogging of the element 70 so that the axial position of the filter assembly 52 at any time will be an accurate indication of the condition of the filter element 70. The actuator member 162 and the pointer element 164 are operable to indicate the position of the filter assembly 52 and thus the condition of the filter element 70 exteriorly of the device.

When the element 70 has reached a clogged condition at which cleaning is desired, the filter assembly 52 will have moved to an axial position which will cause the pointer element 164 to actuate the switch 166 to a closed position. Closing of the switch 166 will energize the solenoid 168 to actuate the valve 170 and cause the actuating rod 174 of fluid cylinder 172 to be moved to an extended position. This movement of the actuating rod 174 will act through the connecting member 176A to produce a corresponding upward axial movement of the rod member 80 and the cap member 32.

Upward movement of the rod member 80 will cause the valve member 90 to be moved upwardly along the exterior surface of the inner tubular member 48 to a position in which the bevel 105 seats against the lower edge of the inner tubular member 48 to seal off communication between the reservoir 10 and the interior of the inner tubular member 48.

Upward movement of the cap member 32 will permit the spring member 44 to move the valve member 46 upwardly to a position closing the chamber 30 from the outlet 36 and opening a fluid path around the outer surface of the valve member 46 to the outlet 36. In this position of the valve member 46 fluid is drawn from the reservoir 10 through the annular space defined intermediate the tubular members 24 and 48 past the scalloped portion 42 of the mounting member 20 and past the valve member 46 to the outlet 36. It is apparent then that upon actuation of the cleaning cycle a fluid path is opened directly from the reservoir 10 to the outlet 36 bypassing the filter element 70 so the fluid system can continue to operate as the filter element 70 is being cleaned.

Once the valve members 38 and 90 have been moved to the cleaning position, a second fluid preferably pressurized air can be directed through the port 180 and into the interior of the filter element 54. It is to be understood that with conventional means, which will be described in detail below, connected with the pointer element 164, the air supply means 186 could if desired be made operable to be actuated automatically upon the valve members 46 and 90 being moved to the cleaning position. The pressurized air is directed radially outwardly through the filter element 70 in a direction reverse to normal fluid flow therethrough. The pressurized air carries the foreign particles which have accumulated on the inlet side of the filter element 70 axially through the valve member 90, the tubular conduit 112, axially upwardly through the stand pipe 124 and into the wire basket 146. The wire basket 146 separates the foreign particles from the fluid which then flows back into the reservoir 10 through the opening 156. The foreign particles can be periodically removed by removing the cap member 136 to permit removal of the basket 146.

The valve members 46 and 90 then can be returned to the normal operating position by actuating the fluid cylinder 172 to return the rod member 80 and the cap member 32 to the normal position.

FIG. 3 illustrates diagrammatically one preferred system for making the assembly automatically operable. Upon movement of the pointer member 164 to a position in which cleaning of the filter element 70 is desired, the normally open switch 166 is closed to energize the valve 170 through a timer 188 and the solenoid 168 and to start the cleaning cycle as described above. The timer 188 maintains energization of the solenoid 168 for a predetermined time period calculated to provide cleaning of the filter element 70 and then to de-energize the solenoid 168 so that the filter device 18 will then return to its normal operating position.

Closure of the switch 166 also energizes solenoids 190 and 191 through timers 192 and 193 respectively. Energization of the solenoid 190 opens a valve 194 connecting the air supply 186 to the port 180 and to thereby introduce the cleaning fluid into the filter device 18. The timer 192 is operable to deenergize the solenoid 190 after a time period calculated to produce cleaning of the filter element 70.

The timer 193 is of the type operable to delay energization of a valve 195 connecting the port 180 to the air evacuating means 185 until after the valve 194 has returned to the closed position. The timer 193 then energizes the valve 195 to evacuate air from the filter device 18 through the port 180.

Figure 4:
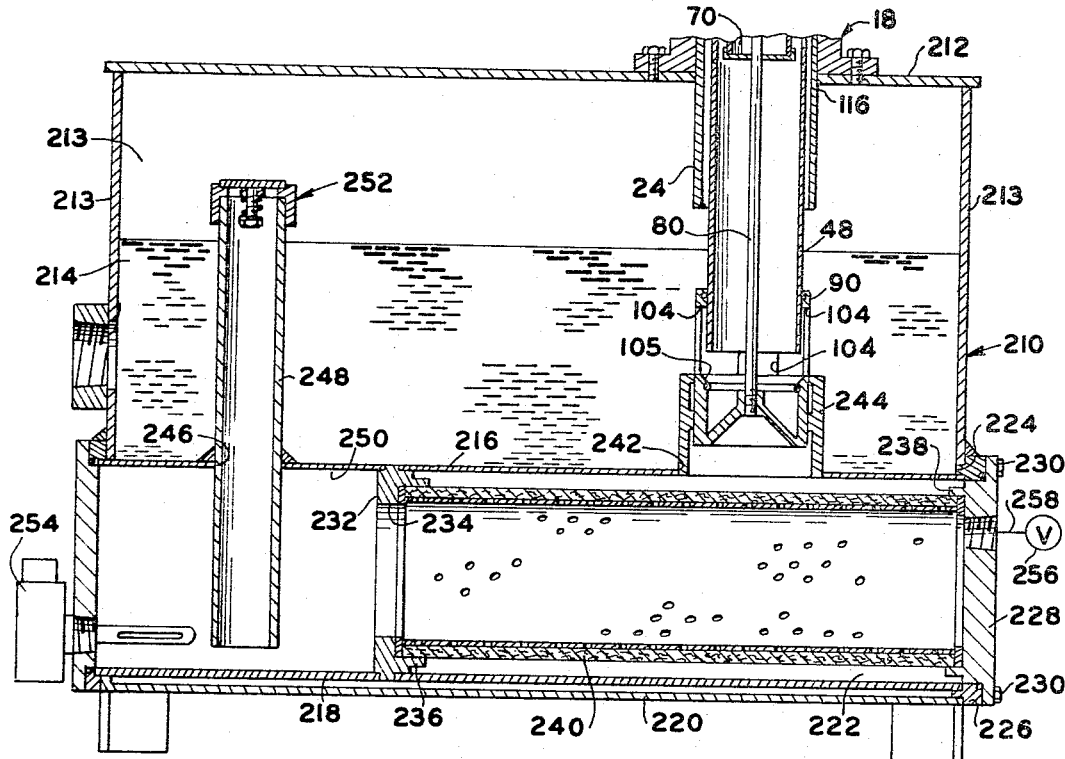
FIG. 4 is a view similar to FIG. 1 but illustrating fragmentarily another preferred filter assembly of the present invention.

FIG. 4 illustrates another preferred fluid filtering system in which a modified construction of the reservoir and collector assembly is utilized. The filter device 18 is of the same construction as that described above and is therefore illustrated fragmentarily.

The fluid reservoir 210 comprises a top plate 212 and walls 213 and is adapted to carry a suitable supply of fluid 214. The top plate 212 is provided with an opening 116 which receives the tubular housing member 24 of the filter device 18.

The fluid reservoir 210 further comprises a pair of horizontally extending and vertically spaced shelf members 216 and 218 extending across the reservoir 210 and secured to the side walls 213 in a position spaced above a bottom plate 220. The shelf members 216 and 218 define a collection chamber 222.

One of the side walls 213 is provided with a circular opening 224 providing access to the collection chamber 222 and which is outlined by a circular mounting member 226 secured to the exterior surface of the side wall 213. A closure plate 228 is preferably secured against the mounting member 226 in fluid tight fashion by bolts or screws 230.

A vertical closure member 232 is mounted intermediate the shelf members 216 and 218 to close the one end of the collection chamber 222 and is provided with a central opening 234. The closure member 232 is provided with an annular flange 236 concentric with the opening 234 and extending axially into the collection chamber 222. The flange 236 and an aligned flange portion 238 provided on the closure plate 228 provide the means by which a cylindrical filter element 240 is disposed within the collection chamber 222 with the interior of the element 240 in registry with the opening 234 in the closure member 232.

The shelf member 216 is provided with an opening 242 which registers with the collection chamber 222 on the inlet side of the filter element 240. An upwardly extending tubular member 244 is secured within the opening 242 and receives the valve member 90 of the filter device 18 so that when the valve member 90 is in the normal position communication is open between the fluid reservoir 210 and the interior of the inner tubular member 48 of the filter device 18 and between the fluid reservoir 210 and the collection chamber 222. When the valve member 90 is moved to the cleaning position as described above then communication is closed between the fluid reservoir 210 and the interior of the tubular member 48 and communication is opened between the interior of the tubular member 48 and the collection chamber 222.

The shelf member 216 is also provided with an opening 246 in an area spaced from the collection chamber 216. A stand pipe 248 is carried in the opening 246 and has one end registering with a receiving chamber 250 defined by the shelf members 216 and 218, the walls 213, and the closure member 232 in an area closely adjacent the shelf member 218. The upper end of the stand pipe 248 registers with the interior of the fluid reservoir 210 and is normally closed by a check valve assembly 252. The check valve assembly 252 is operable to open upon a predetermined increase in pressure within the stand pipe 248.

A fluid level switch 254 extends into the receiving chamber 250 somewhat above the end of the standpipe 248 and is electrically connected to a solenoid actuated normally closed relief valve 256 carried in conduit 258 connected with the collection chamber 222.

Upon the valve member 90 being moved to the cleaning position and air pressure being directed in a reverse direction through the filter element 70 of the filter device 18 as described above, the foreign particles dislodged from the filter element 70 are carried through the tubular member 244 and into the collection chamber 222. The foreign particles are retained in the collection chamber 222 by the filter element 240 and the pressurized air and cleaned fluid passes through the opening 246 into the receiving chamber 250.

The pressurized air forces the cleaned fluid actually upwardly through the stand pipe 248 and past the check valve assembly 252 into the fluid reservoir 210. The fluid level switch 254 prevents air from escaping from the receiving chamber 250 into the reservoir 210 by actuating the relief valve 256 to relieve air pressure in the collection chamber 222 and thus the receiving chamber 250 before the fluid level in the receiving chamber 250 reaches a point at which there is danger of air entering the standpipe 248.

The system of FIG. 4 is returned to the normal position in the same manner as described above with reference to FIGS. 1 and 2.

It is apparent that the preferred embodiments of the present invention provide continuous fluid filtering systems in which automatically actuated means are provided for cleaning a filter element for mobile or bayonet filter devices in place and without requiring interruption of the operation of the fluid system. While each of the embodiments disclosed provides substantial advantages over heretofore known continuous filtering systems by permitting air to be used as the cleaning fluid. This is accomplished by maintaining the air completely separated from the working fluid throughout the cleaning cycle and returning the fluid to the reservoir with little danger of the fluid and air intermixing.

It is also apparent that although I have described but several embodiments of my invention many changes and modifications can be made therein without departing from the spirit of the invention as expressed by the appended claims.

I claim:
1. In a fluid system, a fluid reservoir and a self-cleaning filtering assembly comprising
 (a) a housing defining a filter chamber, an outlet, and a first inlet means normally connecting said reservoir with said filter chamber,
 (b) means defining a collection chamber separated from said filter chamber,
 (c) a filter element carried in said filter chamber,
 (d) a first valve means operable upon being actuated to close communication between said reservoir and said filter chamber and to provide a fluid path between said filter chamber and said collection chamber,
 (e) means sensing the clogged condition of said filter element and operable upon said filter element reaching a predetermined clogged condition to actuate said first valve means,
 (f) means actuated by said sensing means to direct a cleaning fluid under pressure through said filter element and into said collection chamber in a direction opposite to normal fluid flow through said element, and
 (g) a second valve means actuated by said sensing means and operable upon being actuated to open a fluid path directly from said reservoir to said outlet bypassing said filter chamber.
2. The system as defined in claim 1 and in which
 (a) said first inlet means comprises a first tubular member having one end disposed within said reservoir, and
 (b) a second inlet means comprising a second tubular member receiving said first tubular member and having one end disposed within said reservoir.
3. The system as defined in claim 2 and in which
 (a) said first valve means is operable to close communication between said end of said first tubular member and said reservoir, and
 (b) said second valve means is disposed intermediate said tubular members and normally closes fluid flow through said second inlet means from said reservoir to said outlet.
4. The system as defined in claim 1 and including a filter element removably carried in said collection chamber.

5. The system as defined in claim 4 and including means directing fluid through said last mentioned filter element to said reservoir.

6. The system as defined in claim 5 and in which said last mentioned means includes a standpipe receiving fluid from said filter chamber at one level and returning said fluid to said reservoir at a higher level whereby air contained within said cleaning fluid tends to be separated from the fluid returning to said reservoir.

7. In a fluid system, a fluid reservoir and a self cleaning filtering assembly comprising
(a) a housing defining a filter chamber, an outlet, and a first inlet means normally connecting said reservoir with said filter chamber,
(b) means defining a collection chamber separated from said filter chamber,
(c) a filter element carried in said filter chamber,
(d) a first valve means operable upon being actuated to close communication between said reservoir and said filter chamber and to provide a fluid path between said filter chamber and said collection chamber,
(e) pressure responsive means sensing the clogged condition of said filter element and operable upon said filter element reaching a predetermined clogged condition to actuate said first valve means,
(f) a second inlet means and a second valve means normally opening communication between said filter chamber and said outlet and closing communication between said second inlet means and said outlet,
(g) said second valve means being operable upon being actuated to close fluid flow from said filter chamber to said outlet and to open a fluid path from said second inlet means directly to said outlet, and
(h) means actuating said second valve means upon actuation of said first valve means.

8. The system as defined in claim 7 and in which
(a) said actuating means comprises a fluid cylinder operably connected to said first and second valve means, and
(b) said pressure responsive means being operable to actuate said actuating means upon a predetermined increase in the pressure differential across said filter element.

9. The system as defined in claim 7 and including means actuated by said pressure responsive means to direct a cleaning fluid through said filter element and into said collection chamber upon said first valve means being actuated.

10. The system as defined in claim 9 and in which said cleaning fluid is air.

11. The system as defined in claim 9 and in which
(a) said first inlet means comprises a first tubular member having one end disposed within said reservoir and said first tubular member defining said filter chamber, and
(b) said second inlet means comprising a second tubular member receiving said first tubular member and having one end disposed within said reservoir.

12. The system as defined in claim 11 and in which (a) said first valve means is operable to close communication between said end of said first tubular member and said reservoir, and
(b) said second valve means is disposed intermediate said tubular members and normally closes fluid flow through said second inlet means from said reservoir to said outlet.

13. The system as defined in claim 11 and including a filter element removably carried in said collection chamber.

14. The system as defined in claim 13 and including means directing fluid through said last mentioned filter element to said reservoir.

15. The system as defined in claim 14 and in which said last mentioned means includes a stand pipe receiving fluid from said filter chamber at one level and returning said fluid to said reservoir at a higher level whereby air contained within said cleaning fluid tends to be separated from the fluid returning to said reservoir.

16. In a filtering system, a fluid reservoir and a self cleaning filtering assembly comprising,
(a) a housing including an inlet portion extending into said reservoir and defining a filter chamber,
(b) means defining a collection chamber separated from said filter chamber and means connecting said reservoir and said collection chamber,
(c) a filter element carried in said filter chamber,
(d) valve means operable upon being actuated to close communication between said reservoir and said filter chamber and to provide a fluid path between said filter chamber and said collection chamber,
(e) means sensing the clogged condition of said filter element and operable upon said filter element becoming clogged to a predetermined degree to actuate said valve means,
(f) means actuated by said sensing means to direct a cleaning fluid under pressure through said filter element and into said collection chamber in a direction opposite to normal fluid flow through said element,
(g) a second inlet being provided in said housing,
(h) an outlet provided in said housing, and
(i) a normally closed valve means disposed intermediate said second inlet and said outlet and being actuated by said sensing means to open a fluid path directly from said second inlet to said outlet bypassing said filter element.

References Cited
UNITED STATES PATENTS

| | | | |
|---|---|---|---|
| 3,053,389 | 9/1962 | Rosaen et al. | |
| 3,076,336 | 2/1963 | Rosaen et al. | |
| 3,080,058 | 3/1963 | Rosaen. | |
| 3,117,525 | 1/1964 | Rosaen. | |
| 3,151,065 | 9/1964 | Smith et al. | 210—108 |
| 3,283,903 | 11/1966 | Muller | 210—108 |
| 3,289,839 | 12/1966 | Muller | 210—108 X |

REUBEN FRIEDMAN, *Primary Examiner.*

D. M. RIESS, *Assistant Examiner.*